United States Patent
Kojima et al.

(10) Patent No.: US 8,682,533 B2
(45) Date of Patent: Mar. 25, 2014

(54) LANE DEPARTURE PREVENTION DEVICE AND VEHICLE PROVIDED WITH SAME

(75) Inventors: Takao Kojima, Hitachinaka (JP); Toshiharu Sugawara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/512,953

(22) PCT Filed: Dec. 3, 2010

(86) PCT No.: PCT/JP2010/071663
§ 371 (c)(1),
(2), (4) Date: May 31, 2012

(87) PCT Pub. No.: WO2011/068194
PCT Pub. Date: Jun. 9, 2011

(65) Prior Publication Data
US 2012/0239255 A1     Sep. 20, 2012

(30) Foreign Application Priority Data

Dec. 4, 2009   (JP) .................................. 2009-276666

(51) Int. Cl.
*A01B 69/00* (2006.01)
(52) U.S. Cl.
USPC ......................................................... 701/42
(58) Field of Classification Search
USPC ..................................... 701/41, 42
See application file for complete search history.

(56) References Cited

U.S. PATENT DOCUMENTS

| | | | |
|---|---|---|---|
| 2003/0078712 A1* | 4/2003 | Shimakage et al. | 701/41 |
| 2005/0113999 A1 | 5/2005 | Tange et al. | |
| 2007/0169007 A1* | 7/2007 | Hashimoto et al. | 717/136 |
| 2010/0148948 A1* | 6/2010 | Murphy et al. | 340/435 |
| 2012/0265403 A1* | 10/2012 | Svensson et al. | 701/41 |

FOREIGN PATENT DOCUMENTS

| | | |
|---|---|---|
| JP | 3631825 B2 | 3/2005 |
| JP | 2005-178743 A | 7/2005 |
| JP | 2008-290679 A | 12/2008 |
| JP | 2009-190464 A | 8/2009 |
| JP | 2009-208682 A | 9/2009 |
| JP | 2009-214680 A | 9/2009 |

OTHER PUBLICATIONS

Corresponding International Search Report with English Translation dated Feb. 15, 2011 (five (5) pages).
Form PCT/ISA/237 (five (5) pages).

* cited by examiner

*Primary Examiner* — Muhammad Shafi
*Assistant Examiner* — Michael D Lang
(74) *Attorney, Agent, or Firm* — Crowell & Moring LLP

(57) ABSTRACT

A lane departure prevention device includes departure prevention control means that performs control to prevent deviation from a lane based on a result of detection means such as sensors and a camera, driver's intention determination means that determines driver's steering intention and actuator activation limiting means that limits activation of an actuator based on the driver's steering intention from the driver's intention determination means. The driver's intention determination means calculates a variation ΔTh in the steering torque detected and a variation ΔTs in the control command value to a steering actuator, and determines that, when |ΔTh|−|ΔTs| is a threshold or more, driver's operational intention is present and limits the activation of the departure prevention control. This can avoid the interruption of departure prevention control in response to activation of an actuator for lane departure avoidance that a driver does not intend because of erroneous detection that a driver intends as such.

6 Claims, 8 Drawing Sheets

LANE DEPARTURE PREVENTION DEVICE AND VEHICLE PROVIDED WITH SAME

TECHNICAL FIELD

The present invention relates to a lane departure prevention device to prevent a vehicle from departing from a travelling path.

BACKGROUND ART

Conventionally lane departure prevention devices are known to recognize a lane of a vehicle based on a photographed image of a driving environment in front of the vehicle using a camera or the like, estimate a position of the vehicle after a predetermined time from the recognition timing at control intervals, and when deviation of the vehicle from the recognized lane is expected, activate a steering actuator and a brake actuator to support deviation avoidance.

When this lane departure prevention device determines that the vehicle will depart from the lane and then detects a turn signal operation, the lane departure prevention device determines that the deviation is due to an intentional operation by the driver (e.g., lane change), and limits a deviation avoidance operation. In some travelling situations, a driver may change the lane intentionally without operating a turn signal. Therefore conventionally is known a technique to determine the operational intention of the driver on the basis of the output from a steering torque sensor detecting a steering torque by the driver as a signal other than the turn signal operation, to limit the deviation avoidance operation.

For instance, Patent Document 1 and Patent Document 2 disclose these conventional techniques.

Patent Document 1: JP Patent No. 3631825
Patent Document 2: JP Patent Application Publication No. 2008-290679 A

DISCLOSURE OF THE INVENTION

Problem to be Solved by the Invention

The aforementioned conventional method to determine the operational intention of a driver, however, has the following problem to be solved. That is, a steering torque sensor is provided between an input side and an output side of a steering shaft, and is configured to detect a steering torque on the basis of a torsional amount generated at the steering torque sensor due to a torque applied to the input/output shaft ends, and therefore the detection value of the steering torque sensor will be influenced directly or indirectly by the activation of the actuator for deviation avoidance. That is, an output value of the steering torque sensor does not always reflect driver's operational intention, which may lead to erroneous detection of the driver's operational intention.

In view of the aforementioned problems, it is an object of the invention to provide a lane departure prevention device to avoid the interruption of departure prevention control in response to activation of an actuator for lane departure avoidance that a driver does not intend because of erroneous detection that a driver intends as such.

Means for Solving the Problem

In order to cope with the aforementioned problems, a lane departure prevention device of the present invention includes steering torque detection means to detect a steering torque. The device includes: steering torque variation detection means that detects a variation in output from the steering torque detection means; command value variation detection means that detects a variation in command value to an actuator that is activated to avoid deviation from a lane of a vehicle; driver's intention determination means that determines, when a difference between an output from the steering torque variation detection means and the command value variation detection means is a threshold or more, that a driver's operational intention is present; and actuator activation limiting means that limits the command value on a basis of an output from the driver's intention determination means.

Another lane departure prevention device of the present invention includes: departing amount estimation means that estimates a departing amount of a vehicle departing from a lane after a predetermined time; departure prevention control means that calculates, on a basis of an output from the departing amount estimation means, a command value to an actuator that is activated to avoid deviation from the lane; and steering torque detection means that detects a steering torque. The lane departure prevention device includes: steering torque variation detection means that detects a variation in output from the steering torque detection means: command value variation detection means that detects a variation in the command value to the actuator; driver's intention determination means that determines that, when a difference between an output from the steering torque variation detection means and the command value variation detection means is a threshold or more, a driver's operational intention is present; and actuator activation limiting means that limits the command value on a basis of an output from the driver's intention determination means.

A vehicle of the present invention includes the aforementioned lane departure prevention device.

This application claims the benefit of priority to JP Patent Application No. 2009-276666, the specification and/or the drawings of which are herein incorporated by reference.

Effects of the Invention

According to the present invention, determination can be made as to whether a variation of steering torque is due to driver's operational intention or due to activation of an actuator for departure prevention. Therefore, interruption of departure prevention control in response to activation of the actuator that the driver does not intend can be avoided, for example. In this way, according to the present invention, departure prevention control can be performed correctly by appropriately determining the driver's operational intention.

BEST MODE FOR CARRYING OUT THE INVENTION

The following describes Embodiment 1 of the present invention, with reference to the drawings.

Figure 1:
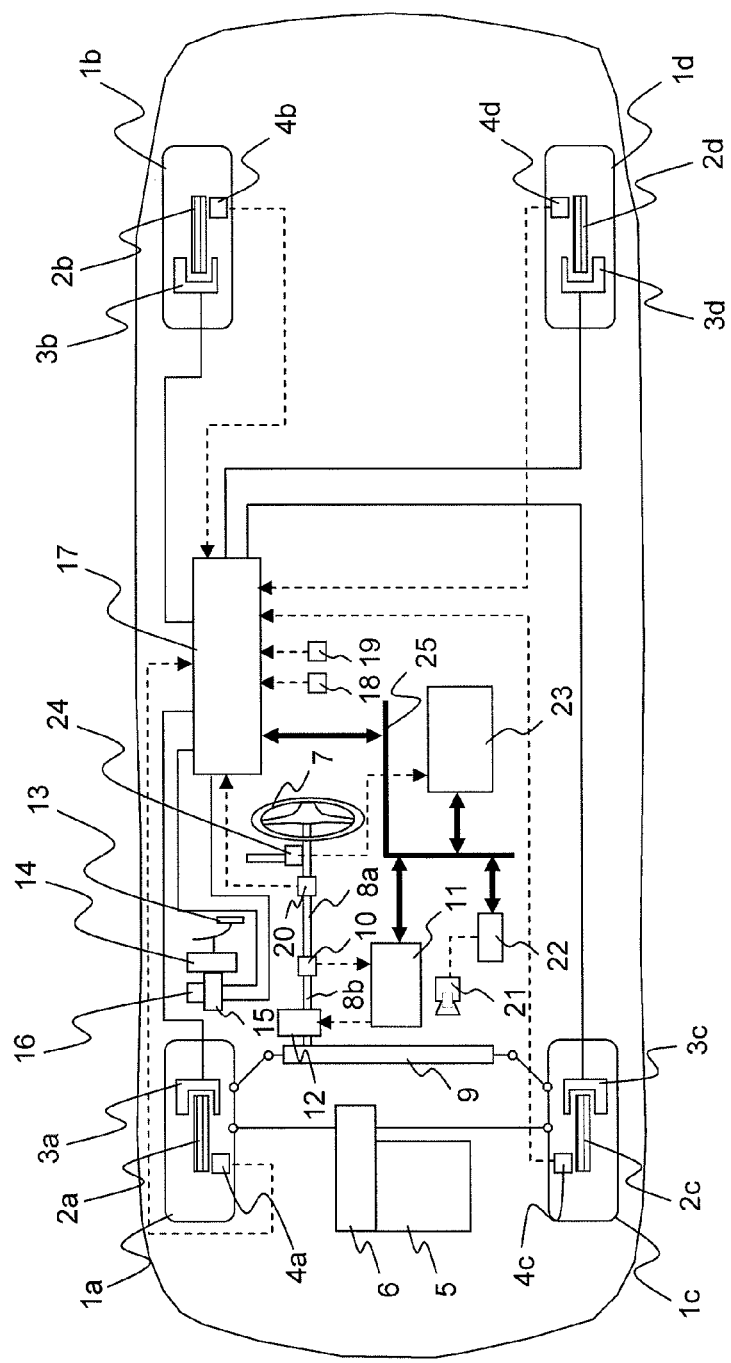
FIG. 1 schematically shows a configuration of a vehicle provided with a lane departure prevention device.

FIG. 1 schematically shows a configuration of a vehicle provided with a lane departure prevention device according to the present invention. The vehicle is provided with wheels 1a to 1d. Among the wheels, an output from an engine 5 is transmitted to the wheels 1a and 1c via a transmission 6 for driving.

A steering has an electronic-controllable configuration, including a steering wheel 7, an input shaft 8a, a steering torque sensor 10, an output shaft 8b, a steering rack 9, a steering control unit 11 and a steering actuator 12. The steering torque sensor 10 is a so-called torsion bar to detect a torque applied between the input/output shafts on the basis of the torsion amounts of the input shaft 8a and the output shaft 8b. The steering control unit 11 controls an output amount of the steering actuator 12 on the basis of the output from the steering torque sensor 10.

A brake pedal 13 is provided with a booster 14, a master cylinder 15 and a reservoir tank 16, and is typically configured so that a stepping force (pedal pressure) applied by the driver to the brake pedal 13 is boosted by the booster 14, and the resultant is transmitted to wheel cylinders 3a to 3d via fluid. The pedal pressure transmitted to the wheel cylinders 3a to 3d presses the brake pad (not illustrated) against brake rotors 2a to 2d rotating integrally with the wheels 1a to 1d, thus generating a braking force. Between the master cylinder 15 and the wheel cylinders 3a to 3d is provided a brake control unit 17 that is capable of independently increasing/decreasing the fluid pressure to be applied to each of the wheel cylinders 3a to 3d on the basis of the outputs from wheel speed sensors 4a to 4d, a steering angle sensor 20, a yaw rate sensor 18 and a lateral acceleration sensor 19.

This vehicle is provided with a camera 21 to determine the possibility that the vehicle departs from a lane. The camera 21 includes an image capturing device of a CCD (Charge Coupled Device) type, a CMOS (Complementary Metal Oxide Semiconductor) type or the like, and is capable of acquiring an image of a lane in front of the vehicle. A camera control unit 22 recognizes a road marking or the like by image processing of an image acquired by the camera 21, and detects the same as positional information with reference to the vehicle. Although the vehicle illustrated in FIG. 1 includes a single camera, image information acquired by two or more cameras may be used. For instance, a traveling environment in front of the vehicle may be three-dimensionally recognized by a well-known stereo recognition technique using parallax, and attribute information on an object such as a curb, a guardrail or a stopped vehicle may be reflected on the lane departure prevention control.

A control unit 23 is equipped with a lane departure prevention function in the present invention, and is configured to receive a signal from a turn signal switch 24. Each control unit (11, 17, 22 and 23) and a control unit (not illustrated) on the vehicle are capable of exchanging information with other control units via a vehicle control network 25 (partially illustrated) to acquire a sensor value that another control unit has or to output a command to another control unit to correct a control amount. For instance, the control unit 23 can instruct the steering control unit 11 to increase/decrease a control amount of the steering actuator 12.

Figure 2:
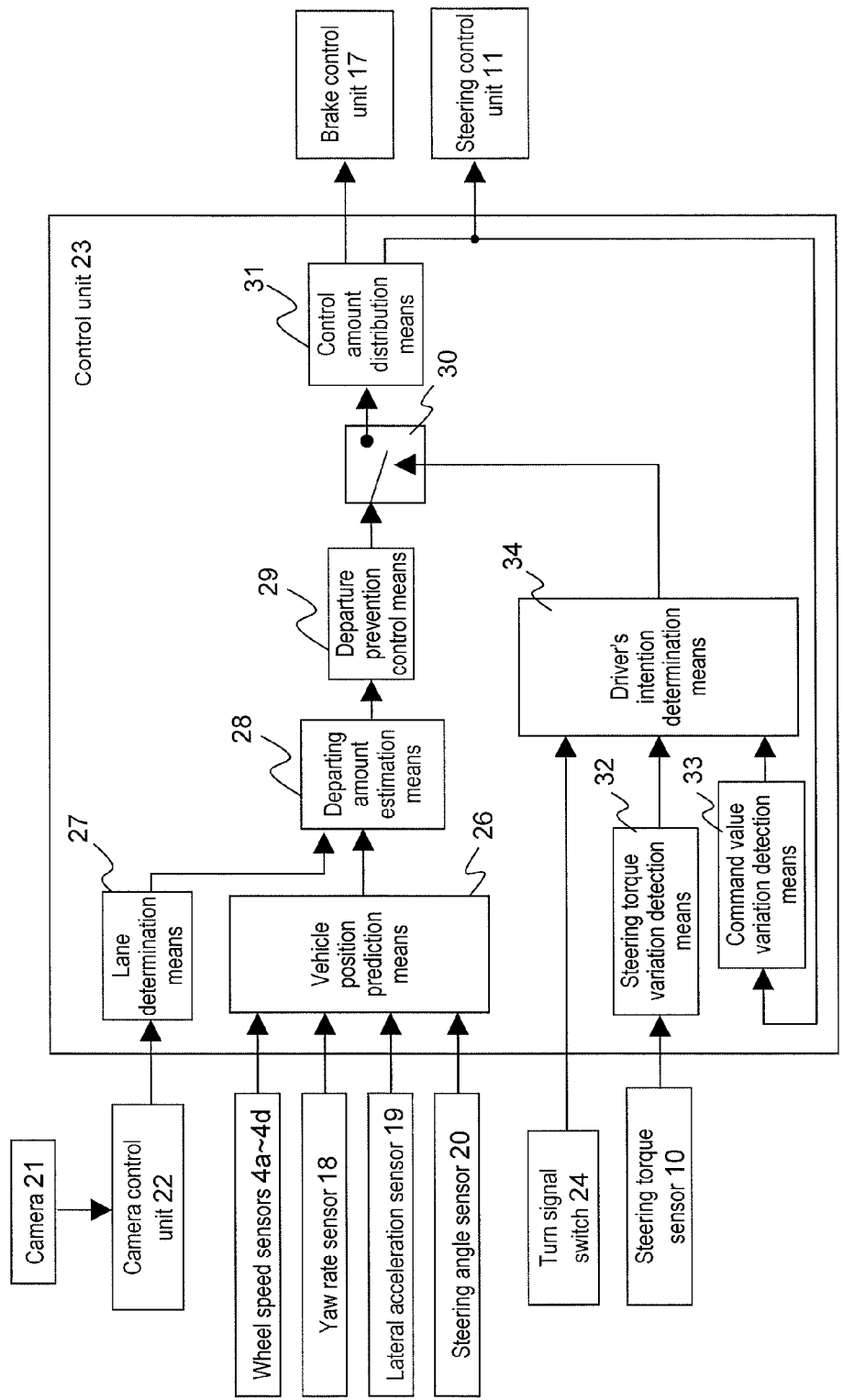
FIG. 2 is a control block diagram of a control unit 23.

Referring next to a control block diagram of FIG. 2, the following describes the control unit 23.

The control unit 23 receives detection values of the wheel speed sensors 4a to 4d, the yaw rate sensor 18, the lateral acceleration sensor 19, the steering angle sensor 20 and the steering torque sensor 10 and data on the vehicle lane detected by the camera control unit 22. The control unit 23 performs calculation processing of these data in accordance with a predetermined program, and outputs an activation command to at least one of the steering control unit 11 and the brake control unit 17 via the vehicle control network 25 for lane departure prevention of the vehicle.

The control unit 23 includes vehicle position prediction means 26, lane determination means 27, departing amount estimation means 28, departure prevention control means 29, actuator activation limiting means 30, control amount distribution means 31, steering torque variation detection means 32, command value variation detection means 33 and driver's intention determination means 34.

The vehicle position prediction means 26 predicts a position of the vehicle after a predetermined time $\tau p$ on the basis of the detection values of the wheel speed sensors 4a to 4d, the yaw rate sensor 18, the lateral acceleration sensor 19 and the steering angle sensor 20.

The lane determination means 27 determines an area where the vehicle can travel on the basis of the road making or the like detected by the camera control unit 22, and sets a boundary of a lane.

The departing amount estimation means 28 estimates, on the basis of the outputs from the vehicle position prediction means 26 and the lane determination means 27, a departing amount of the vehicle position after the predetermined time $\tau p$ from the boundary of the lane set by the lane determination means 27. Then, the departure prevention control means 29 calculates, on the basis of the output from the departing amount estimation means 28, a target yaw moment to be generated at the vehicle to avoid deviation.

When an operational intention of the driver is detected on the basis of the output from the driver's intention determination means 34 described later, the actuator activation limiting means 30 limits the output of the departure prevention control means 29 to limit the deviation avoidance operation. That is, in the case of driver's intentional lane deviation such as lane change, a priority is given to such a driver's intention for smooth operation, and deviation avoidance operation is performed only for the deviation that the driver does not intend.

In order to generate a yaw moment at the vehicle so as to avoid deviation from the lane, the control amount distribution means 31 calculates, on the basis of the target yaw moment, command values to be output to the steering control unit 11 and the brake control unit 17 from the control unit 23.

The driver's intention determination means 34 determines whether the deviation from a lane results from the driver's intention or not on the basis of the outputs from the turn signal switch 24, the steering torque variation detection means 32 and the command value variation detection means 33. When operation of the turn signal switch 24 is detected, the actuator activation limiting means 30 limits the deviation avoidance operation because the driver's intentional operation clearly follows. When deviation between the output from the steering torque variation detection means 32 and the output from the command value variation detection means 33 is a threshold or more as well, the driver's intention determination means 34 determines the presence of the driver's intentional operation. The steering torque variation detection means 32 outputs a value that is an absolute value of time derivative $\Delta Th$ of the steering torque sensor 10, and the command value variation detection means 33 outputs a value that is an absolute value of time derivative ΔTs of a control command value that the control amount distribution means 31 outputs to the steering control unit 11.

The calculation processing of the variation ΔTs of the control command value performed by the command value variation detection means 33 includes the processing to estimate a torque that may be generated at the steering wheel 7 because of the activation of the steering actuator 12 in accordance with the control command value. Although each variation detection processing may include filtering processing to smooth a signal, the variation detection processing provided in the steering torque variation detection means 32 and the command value variation detection means 33 desirably have a same frequency property.

Figure 3:
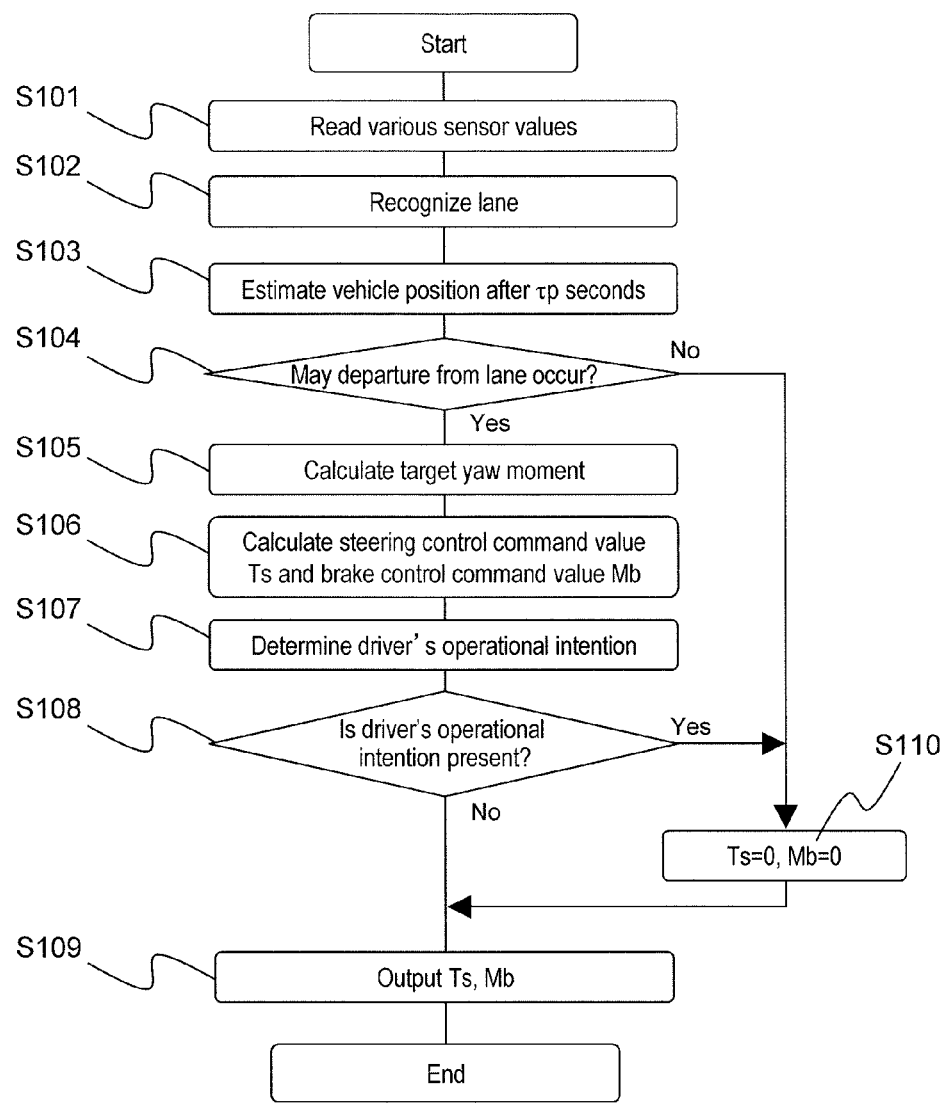
FIG. 3 is a flowchart illustrating an operation of a lane departure prevention device.

Referring now to flowcharts of FIG. 3 and FIG. 4, these operations are described below. Referring firstly to FIG. 3, the overall flowchart is described.

Starting the processing, at Step S101, detection values of the wheel speed sensors 4a to 4d, the yaw rate sensor 18, the lateral acceleration sensor 19, the steering angle sensor 20 and the steering torque sensor 10 and data on road marking or the like detected by the camera control unit 22 are read.

Next, at Step S102, on the basis of the data such as road marking, a lane where the vehicle will travel is recognized, and at Step S103 the vehicle position after a predetermined time τp is estimated. Then at Step S104, comparison is made between the calculated lane at Step S102 and the estimated vehicle position at Step S103 to determine whether the vehicle departs or not from the lane after the predetermined time τp. When the vehicle is determined to depart, at Step S105, a target yaw moment to avoid the deviation is calculated.

Next, at Step S106, on the basis of the target yaw moment, a control command value Ts for the steering control unit 11 and a control command value Mb for the brake control unit 17 are calculated. The steering control command value Ts and the brake control command value Mb are distributed so that the total amount of the yaw moment that can be generated at the vehicle as a result of the action of the steering and the brake in accordance with these command values can be the target yaw moment.

At Step S107, determination is made as to whether the deviation results from the driver's intentional operation or not by the below described method. When the driver's operational intention is not detected and the determination is negative (No), the procedure proceeds to Step S109 where the control command values (Ts, Mb) are output to the steering control unit 11 and the brake control unit 17 to end the procedure.

Herein at Step S104 when it is determined that there is no possibility of deviation, or at Step S108 when the driver's operational intention is detected, the procedure proceeds to Step S110 to limit a command to the steering control unit 11 and the brake control unit 17 so as to suppress lane departure prevention control.

Figure 4:
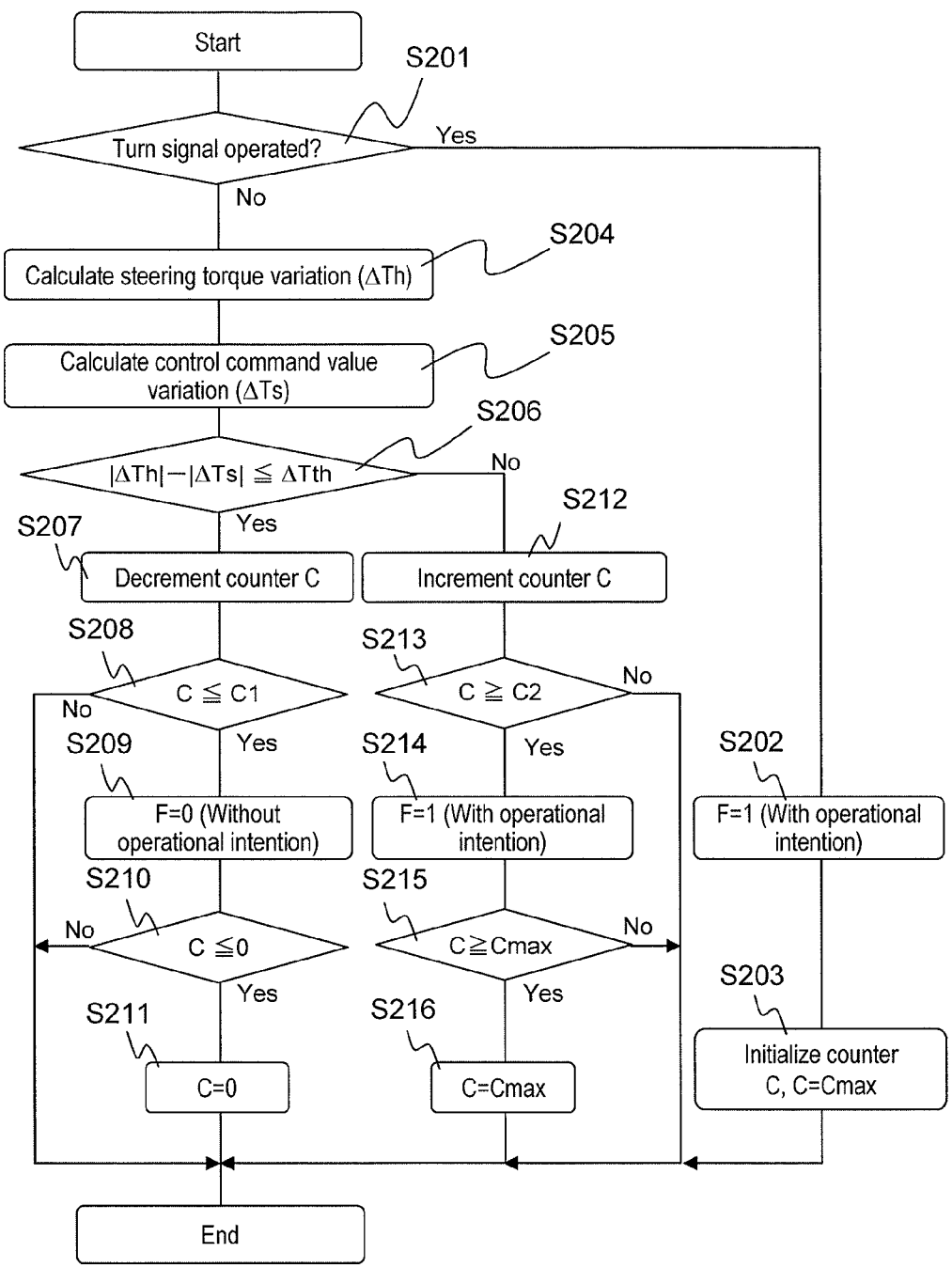
FIG. 4 is a flowchart for determination of driver's operational intention.

Referring next to flowchart of FIG. 4, the processing at Step S107 of FIG. 3 to determine whether the deviation results from driver's intentional operation or not is described.

Firstly at Step S201, determination is made as to whether a turn signal is operated or not on the basis of a signal input from the turn signal switch 24. When the determination is affirmative (Yes) for the turn signal operation at Step S201, the procedure goes to Step S202 where a value 1 is set at a driver's operational intention flag F to indicate the presence of driver's operational intention, and at the following Step S203, a counter upper limiter Cmax is set as the initial value of a counter C to end the procedure once.

On the other hand, when the turn signal operation is not detected and the determination is negative (No) at Step S201, then at Step S204 and Step S205 a steering torque variation ΔTh and a control command value variation ΔTs are calculated, respectively, and at the following step S206, calculation is performed as to whether a deviation (|ΔTh|−|ΔTs|) between the absolute value of the steering torque variation |ΔTh| and the absolute value of the control command value variation |ΔTs| is a threshold ΔTh or more. When this comparison results in the threshold or more, it is determined as the presence of the driver's intentional operation, and at Step S206 the determination will be No. On the other hand, in the case of the threshold or less, it is determined as absence of the driver's intentional operation and at Step S206 the determination will be Yes. This determination is for one control cycle, and the driver's operational intention is finally determined with consideration given to temporal continuity. Steps S207 to S211 illustrate the flow of the procedure to determine temporary continuity when the driver's operational intention is not detected at Step S206, and Steps S212 to S216 illustrate the flow of the procedure to determine temporary continuity when the driver's operational intention is detected at Step S206.

When the driver's operational intention is not detected at Step S206 (affirmative determination), decrementing at Step S207 reduces the value of the counter C. Then, when the driver's operational intention is not detected continuously, the relationship C≤C1 holds for the comparison with a first counter threshold C1 at Step S208. Then, the determination result becomes affirmative, and it is finally determined here as the absence of the driver's operational intention, and at Step S209 the value 0 is set at the driver's operational intention flag F (F=0). At the following Steps S210 and S211, the processing here is lower limit processing of the counter C so as to prevent the counter C from falling below less than 0. Through these steps, the procedure ends once.

On the other hand, when the driver's operational intention is detected at Step S206, incrementing at Step S212 increases the value of the counter C. Then, comparison is made with a second counter threshold C2 at Step S213. In the case of C≥C2, it is finally determined by the affirmative determination that the presence of the driver's operational intention, and at Step S214 the value 1 is set at the driver's operational intention flag F (F=1). At the following Steps S215 and S216, the processing here is upper limit processing of the counter C so as to prevent the counter C from exceeding the upper limit Cmax. Through these steps, the procedure ends once.

In the case of negative determination at Step S208 or Step S213, the value of the driver's operational intention flag F is not changed, and then the procedure ends once. That is, the last determination result is kept.

Figure 5:
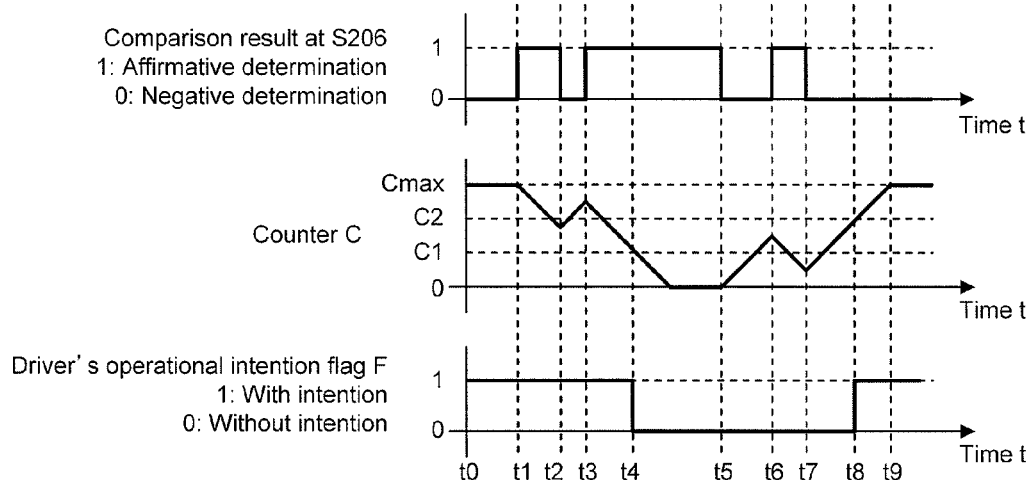
FIG. 5 is a graph illustrating an example of driver's operational intention flag setting timing.

FIG. 5 illustrates one exemplary setting of the counter C and the driver's operational intention flag F on the basis of the determination result at Step S206. In the following description, the flag F refers to the driver's operational intention flag F.

An upper stage of the graph illustrates a determination result at Step S206 (1: affirmative determination, 0: negative determination), a middle stage of the graph illustrates the counter C and a lower stage of the graph illustrates the driver's operational intention flag F (1: with driver's operational intention, 0: without driver's operational intention). The horizontal axis represents a time t, where t1 to t9 are timing when at least one of the three graphs varies.

At time t1 to t4, the counter C increases/decreases on the basis of the determination result at Step S206, and since the counter C does not fall below the first counter threshold C1, the flag F=1 is kept. At time t2 to t3, the counter C becomes the second counter threshold C2 or more and the affirmative determination is made at Step S213 to execute the processing at Step S214. However, since the flag is F=1, the flag does not change.

At time t4, since the counter C falls below the first counter threshold, affirmative determination is made at Step S208, and the flag F turns F=0.

At time t4 to t8, the counter C increases/decreases on the basis of the determination result at Step S206. However, since the counter C is less than the second counter threshold C2, the flag F=0 is kept. At time t6 to t7, the counter C is the first counter threshold C1 or less, and the affirmative determination is made at Step S208 to execute the processing at Step S209. However, since the flag is already F=0, the flag does not change.

Then, at time t8, the counter C becomes the second counter threshold C2 or more, and the flag F again turns F=1.

As for the magnitude relationship among the lower limit 0 and the upper limit Cmax of the counter, the first counter threshold C1 and the second counter threshold C2, C1 and C2 may be set at C1=0 and C2=Cmax, for example, within the range where the relationship $0 \leq C1 < C2 \leq Cmax$ holds. As for the incrementing and decrementing of the counter, the increase/decrease width thereof may be set at a value other than 1, or the increasing width and the decreasing width may be set at different values.

The present invention is not limited to the configurations of the aforementioned embodiments, and can be modified variously in the range without departing from the scope of the present invention.

Figure 6:
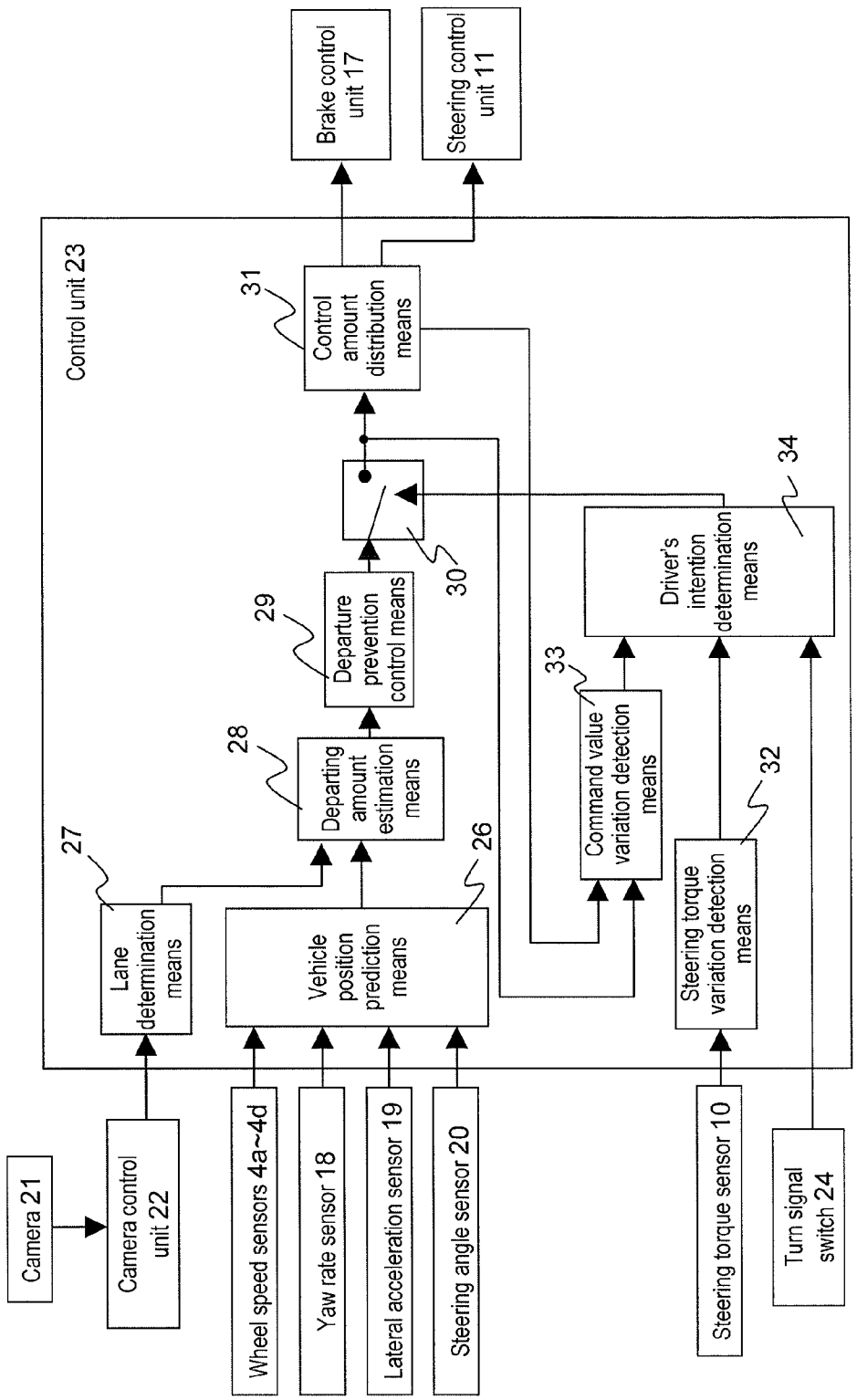
FIG. 6 is a control block diagram illustrating another embodiment of the control unit 23.

FIG. 6 illustrates another embodiment including partial modification of the embodiment illustrated in FIG. 2. This embodiment is configured so as to input the output from the actuator activation limiting means 30 and a control amount distribution ratio as the output from the control amount distribution means 31 to the command value variation detection means 33. That is, an effect similar to the embodiment of FIG. 2 can be obtained because a control command value to the steering control unit 11 can be known on the basis of a target yaw moment for deviation avoidance and a control amount distribution ratio. Further, in the case of the deviation avoidance control using a brake, when different braking forces are applied to steered wheels 1a and 1c, a torque due to the difference between right and left braking forces will act to rotate the steering wheel 7 because of structural characteristics of a steering system. Therefore, similarly to the case of the deviation avoidance control using the steering actuator 12, output from the steering torque sensor 10 varies even without the driver's operational intention. The configuration of FIG. 6 allows the influence by a control command to the brake or the steering on the steering torque sensor 10 to be considered with the target yaw moment and the control amount distribution ratio.

Figure 7:
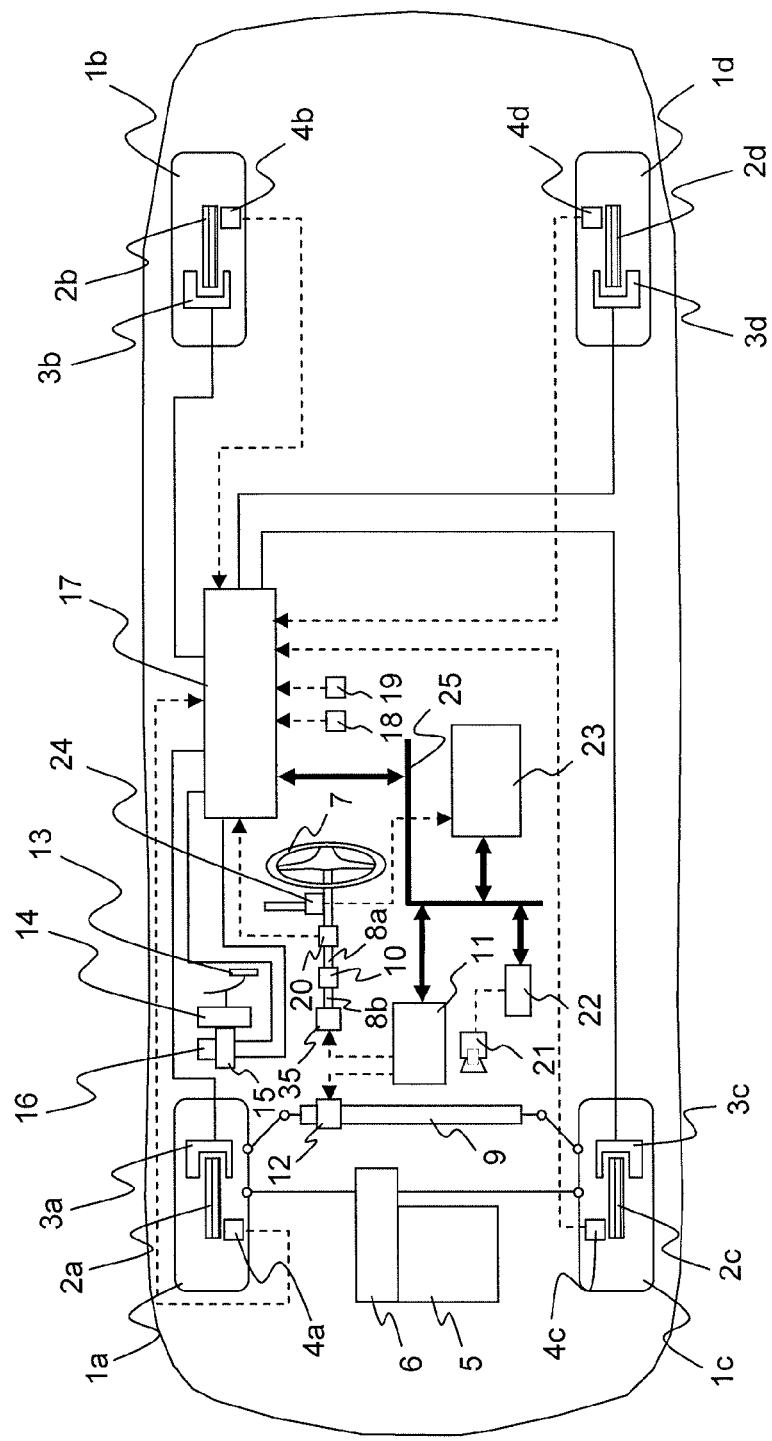
FIG. 7 schematically illustrates a configuration of a vehicle provided with a steer-by-wire steering system.

Examples of a steering system of a vehicle to which the present invention is applicable include not only a conventional type steering system including a mechanical joint between the steering wheel of the vehicle and the steered wheels 1a and 1c as illustrated in FIG. 1 but also a so-called steer-by-wire system without a mechanical joint between the steering wheel and the steered wheels 1a and 1c. FIG. 7 illustrates a configuration of a vehicle in a steer-by-wire system. This example includes a reaction force actuator 35 to apply a steering reaction force to the steering wheel 7, and the steering control unit 11 outputs command values to the steering actuator 12 and the reaction force actuator 35.

Figure 8:
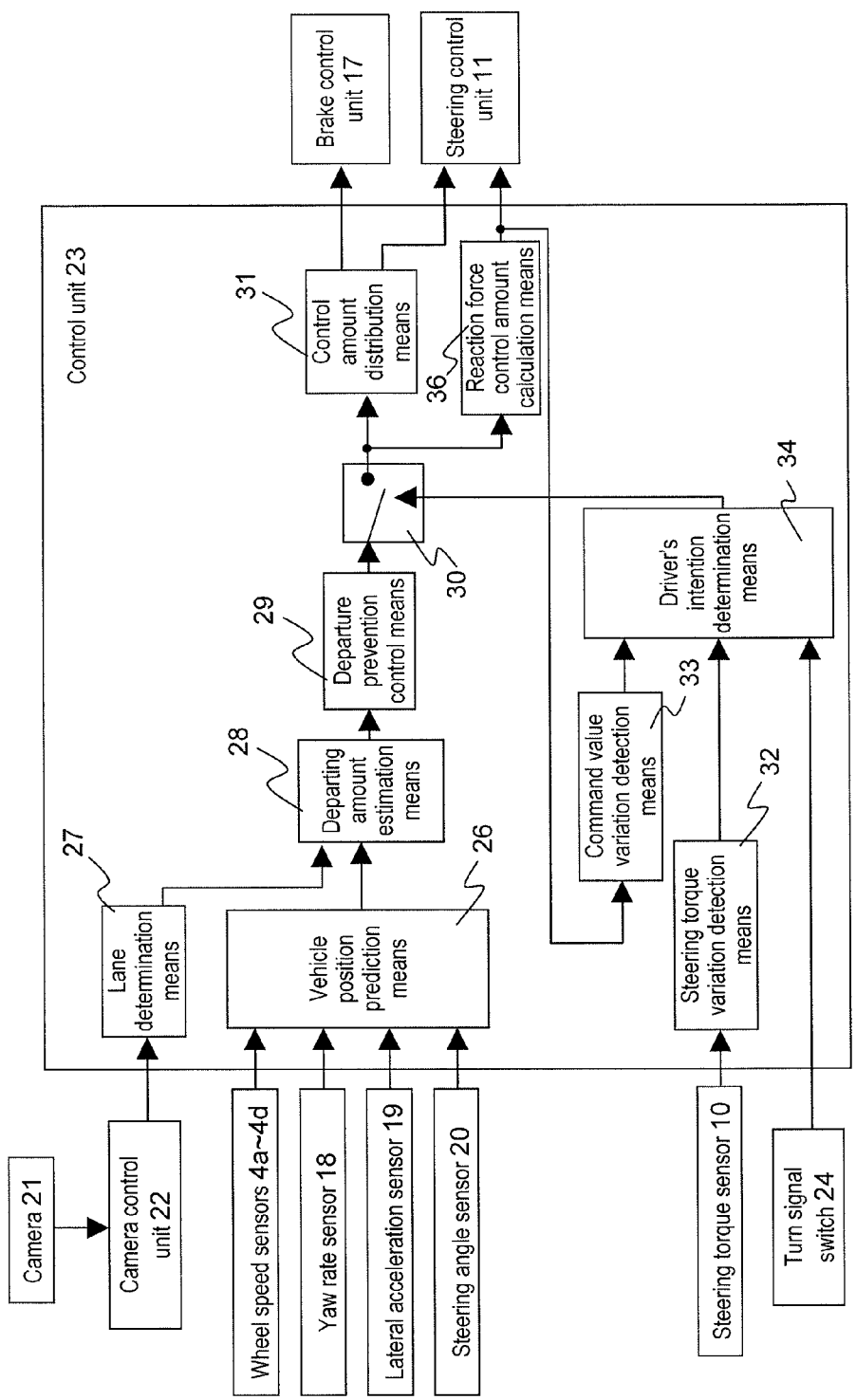
FIG. 8 is a control block diagram of a control unit 23 that is suitable for a steer-by-wire steering system.

FIG. 8 is a control block diagram of the control unit 23 when the present invention is applied to a vehicle provided with a steer-by-wire steering system. Reaction force control amount calculation means 36 is provided to calculate a control amount for the reaction force actuator 35 on the basis of a target yaw moment that the actuator activation limiting means 30 outputs. In this case, the input of the command value variation detection means 33 preferably is the output from the reaction force control amount calculation means 36.

All publications, Patent and Patent Applications cited in the present specification are herein incorporated by reference in their entirety.

DESCRIPTION OF REFERENCE NUMBERS 1a to 1d: Wheels
2a to 2d: Brake rotors
3a to 3d: Wheel cylinders
4a to 4d: Wheel speed sensors
5: Engine
6: Transmission
7: Steering wheel
8a: Input shaft
8b: Output shaft
9: Steering rack
10: Steering torque sensor
11: Steering control unit
12: Steering actuator
13: Brake pedal
14: Booster
15: Master cylinder
16: Reservoir tank
17: Brake control unit
18: Yaw rate sensor
19: Lateral acceleration sensor
20: Steering angle sensor
21: Camera
22: Camera control unit
23: Control unit
24: Turn signal switch
25: Vehicle control network
26: Vehicle position prediction means
27: Lane determination means
28: Departing amount estimation means
29: Departure prevention control means
30: Actuator activation limiting means
31: Control amount distribution means
32: Steering torque variation detection means
33: Command value variation detection means
34: Driver's intention determination means
35: Reaction force actuator
36: Reaction force control amount calculation means

The invention claimed is:

1. A lane departure prevention device including steering torque detection means to detect a steering torque, comprising:
   steering torque variation detection means that detects a variation in output from the steering torque detection means;
   command value variation detection means that detects a variation in command value to an actuator that is activated to avoid deviation from a lane of a vehicle;
   driver's intention determination means that determines, when a difference between an output from the steering torque variation detection means and the command value variation detection means is a threshold or more, that a driver's operational intention is present;

actuator activation limiting means that sets the command value as 0 (zero) when the driver's operational intention is determined to be present on a basis of an output from the driver's intention determination means; and a counter, wherein the driver's intention determination means determines, with the counter, time duration where a state of a difference between an output from the steering torque variation detection means and the command value variation detection means being a threshold or more, so as to determine presence or not of driver's operational intention.

2. The lane departure prevention device according to claim 1, wherein, following an operation of a turn signal, the counter is initialized.

3. A vehicle comprising the lane departure prevention device according to claim 1.

4. A lane departure prevention device, including:

departing amount estimation means that estimates a departing amount of a vehicle departing from a lane after a predetermined time;

departure prevention control means that calculates, on a basis of an output from the departing amount estimation means, a command value to an actuator that is activated to avoid deviation from the lane;

control amount distribution means that distributes the command value to a brake control unit and a steering control unit; and steering torque detection means that detects a steering torque, wherein the lane departure prevention device comprises:

steering torque variation detection means that detects a variation in output from the steering torque detection means:

command value variation detection means that detects a variation in the command value to the actuator;

driver's intention determination means that determines that, when a difference between an output from the steering torque variation detection means and the command value variation detection means is a threshold or more, a driver's operational intention is present; and actuator activation limiting means that sets the command value as 0 (zero) when the driver's operational intention is determined to be present on a basis of an output from the driver's intention determination means.

5. The lane departure prevention device according to claim 4, wherein the command value variation detection means detects a variation of the command value to the steering control unit.

6. A lane departure prevention device, including:

departing amount estimation means that estimates a departing amount of a vehicle departing from a lane after a predetermined time;

departure prevention control means that calculates, on a basis of an output from the departing amount estimation means, a command value to an actuator that is activated to avoid deviation from the lane; and steering torque detection means that detects a steering torque, wherein the lane departure prevention device comprises:

steering torque variation detection means that detects a variation in output from the steering torque detection means:

control amount distribution means that distributes the command value to a brake control unit and a steering control unit;

command value variation detection means that detects a variation in the command value on a basis of an output from the departure prevention control means and a distribution ratio by the control amount distribution means;

driver's intention determination means that determines that, when a difference between an output from the steering torque variation detection means and the command value variation detection means is a threshold or more, a driver's operational intention is present; and actuator activation limiting means that sets the command value as 0 (zero) when the driver's operational intention is determined to be present on a basis of an output from the driver's intention determination means.

* * * * *